US008144576B2

(12) United States Patent
Saltsidis et al.

(10) Patent No.: US 8,144,576 B2
(45) Date of Patent: Mar. 27, 2012

(54) SYSTEM AND METHOD FOR ETHERNET PROTECTION SWITCHING IN A PROVIDER BACKBONE BRIDGING TRAFFIC ENGINEERING DOMAIN

(75) Inventors: Panagiotis Saltsidis, Stockholm (SE); Martin Julien, Laval (CA); Sylvain Monette, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 12/441,440

(22) PCT Filed: Oct. 31, 2008

(86) PCT No.: PCT/IB2008/002936
§ 371 (c)(1),
(2), (4) Date: Dec. 8, 2009

(87) PCT Pub. No.: WO2009/056972
PCT Pub. Date: May 7, 2009

(65) Prior Publication Data
US 2010/0172238 A1 Jul. 8, 2010

Related U.S. Application Data

(60) Provisional application No. 60/984,892, filed on Nov. 2, 2007.

(51) Int. Cl.
*G01R 31/08* (2006.01)
(52) U.S. Cl. .................. 370/228; 370/217; 370/221
(58) Field of Classification Search .................. None
See application file for complete search history.

(56) References Cited

U.S. PATENT DOCUMENTS

| 7,093,027 | B1 | 8/2006 | Shabtay et al. |
| 2004/0156313 | A1 | 8/2004 | Hofmeister et al. |
| 2007/0286204 | A1* | 12/2007 | Ould-Brahim ............. 370/395.5 |
| 2008/0281987 | A1* | 11/2008 | Skalecki et al. ............. 709/253 |
| 2008/0291826 | A1* | 11/2008 | Licardie et al. ............. 370/230 |
| 2009/0003313 | A1* | 1/2009 | Busch et al. ............. 370/352 |

FOREIGN PATENT DOCUMENTS
WO WO 2006/091834 A1 8/2006

OTHER PUBLICATIONS

Martin ("PBB-TE ESP 1:1 Protection Switching" Nortel Networks, IEEE 802.1 Sep. 4-7, 2007).*
EPO, International Search Report and Written Opinion, Apr. 15, 2009.
WIPO, International Preliminary Report on Patentability, May 4, 2010.

* cited by examiner

*Primary Examiner* — Kibrom T Hailu

(57) ABSTRACT

A system and method of providing Ethernet protection switching in a PBB-TE Domain. Two PBB-TE trunks are established between a first B-component and a second B-component. Each trunk includes two unidirectional Ethernet Switching Paths (ESPs), each associated with a possibly different VLAN identifier. Data traffic is mapped onto the first PBB-TE trunk, where the first PBB-TE trunk corresponds to a working entity and the second PBB-TE trunk corresponds to a backup protection entity. Data traffic is sent via a first ESP of the first trunk associated with a first VID and a second ESP of the first trunk associated with a second VID. The two PBB-TE trunks are monitored for faults. Upon detecting a fault on one of the PBB-TE trunks, data traffic is remapped onto the other PBB-TE trunk via a third ESP associated with a third VID and a fourth ESP associated with a fourth VID.

33 Claims, 6 Drawing Sheets

SYSTEM AND METHOD FOR ETHERNET PROTECTION SWITCHING IN A PROVIDER BACKBONE BRIDGING TRAFFIC ENGINEERING DOMAIN

This application claims the benefit of U.S. Provisional Application No. 60/984,892 filed Nov. 2, 2007, the disclosure of which is fully incorporated herein by reference.

TECHNICAL FIELD

The present invention relates generally to communications networks, and in particular, to communications networks that employ systems and methods of Ethernet protection switching in a Provider Backbone Bridging Traffic Engineering (PBB-TE) domain.

BACKGROUND

Over the past few years, Ethernet has become the undisputed leading Local Area Network (LAN) technology due to the intrinsic characteristics of the technology, such as being simple to implement and use, cheap to employ, easy to manage, and backward compatible.

With data services now accounting for the bulk of traffic, telecommunication operators and carriers are looking at the possibility of reaping the same benefits by replacing their Synchronous Digital Hierarchy (SDH)/Synchronous Optical Networking (SONET) infrastructure with an Ethernet-based packet transport infrastructure. However, metro and backbone networks have quite different requirements than enterprise LANs.

Consequently, Ethernet technology requires specific enhancements if it is to fulfill these carrier-grade requirements. Currently, work is being carried out at the Institute of Electrical and Electronics Engineers (IEEE) on the Provider Backbone Bridge Traffic Engineering (PBB-TE) concept, to implement Ethernet technology for carrier use. There is an amendment to the IEEEE P802.1Q standard being discussed (IEEE P802.1Q-2006/D0.1, Draft IEEE Standard for Local and Metropolitan Area Networks: Virtual Bridged Local Area Networks), which is intended to provide a true carrier-grade packet transport solution based on Ethernet.

PBB-TE (i.e. IEEE 802.1Qay/D0.0, Draft Standard for Local and Metropolitan Area Networks-Virtual Bridged Local Area Networks: Provider Backbone Bridges—Traffic Engineering, May 2007) proposes a simple, connection-oriented solution. This implementation maintains the inherent advantages of Ethernet, while addressing the deficiencies of Ethernet as a carrier-class packet transport protocol. It builds upon the concepts brought forth in the amendments to IEEE 802.1Q and, in particular, the network separation of PBB (i.e., IEEE 802.1Qah/D3.8, Draft Standard for Local Metropolitan Area Networks—Virtual Bridged Local Area Networks: Provider Backbone Bridges, October 2007) to provide a scalable solution.

In contrast to Provider Backbone Bridging (PBB), spanning tree protocols and broadcasting/flooding are not used in PBB-TE. Filtering databases are populated using a network management system or an enhanced control plane, allowing Ethernet Switched Paths (ESPs) to be engineered and provisioned across the network. This allows control of traffic flow through the Ethernet-based packet transport network which ensures an optimal allocation of resources. Each ESP represents a unidirectional path. A pair of ESPs that form a bidirectional path across the network defines a PBB-TE trunk or tunnel.

One of the key points addressed in PBB-TE is how to provide end-to-end linear protection for PBB-TE trunks, where a dedicated protection PBB-TE trunk is established for a particular trunk, and the traffic is automatically switched from the working (primary) PBB-TE trunk to the protection (backup) PBB-TE trunk when a failure occurs on the primary trunk.

FIG. 1 is a simplified block diagram illustrating essential elements of an end-to-end linear protection scheme 10 and its arrangement in existing networks for a protection entity 12. The scheme employs normal traffic over an ESP 14 as a working entity and an ESP 16 as a protection entity between a West component 18 and an East component 20. The West component includes a protection switching process 22 and the East component includes a protection switching process 24. At the sending ends, traffic may be arranged in two ways. First, in a 1+1 arrangement, traffic is sent on both the working and protection paths simultaneously (bridged). Second, in a 1:1 or 1 for 1 arrangement, traffic is sent on only one of the paths at any point in time (switched). In both protection arrangements the receiving end selects traffic from the working or protection entities based on information from Operations, Administration and Management (OAM) processes or network operators. In the 1 for 1 case, the sending "protection bridge" and receiving "selector" must be coordinated.

International Telecommunication Union-Telecommunication (ITU-T) defines the term "bridge" for the switch that selects either or both of the transmit paths at the sending end of a protection domain. It should be understood that this is not the same definition as the term "bridge" utilized in the IEEE 802 standard. As defined in the present invention, the ITU-T linear protection bridge refers to a "protection bridge".

In unidirectional linear protection schemes, the selectors at each end of the protection domain operate asynchronously. Specifically, a traffic path selection action at one end does not result in a traffic selection action at the other end on traffic in the reverse direction. Consequently, traffic in one direction may use a different path from the traffic in the other direction.

However, bidirectional linear protection schemes operate synchronously in the sense that a traffic selection action at one end also triggers a corresponding selection action at the other end on traffic in the reverse direction. Thus, traffic in both directions share the same path (i.e., either working or protection).

Protection switching may be triggered by OAM information arising from periodic monitoring of the working and protection paths or from physical layer monitoring, such as loss of signal or frame errors detected through frame check sequence.

Linear protection schemes are usually configurable to be "revertive" or "non-revertive", where reception and transmission traffic, where applicable reverts, to the working path automatically once OAM indicates the fault or defect has cleared.

Most linear protection schemes now aim to switch completely (both ends where appropriate) in less than 50 ms from the occurrence of the fault, not just from the OAM defect indication. Consequently, the periodicity of OAM continuity check messages has to be nearly an order faster to detect the fault and transport the synchronization information end to end.

Most schemes also incorporate hold-off and wait to restore timers. Hold-off times ensure the fault is not just a transient event, arising from some lower level protection switching for instance, while restore times ensures the performance of the working path is fully restored before switching back to it. Obviously, the overall recovery time is greater.

Thus, a scalable end-to-end sub-50 ms resiliency mechanism that offers bidirectional end-to-end linear protection capabilities for point-to-point PBB-TE tunnels or trunks in a PBB-TE domain is needed.

Today, different proprietary and standard based resiliency mechanisms are used within Ethernet networks, such as Spanning Tree Protocol (STP), Rapid Spanning Tree Protocol (RSTP), Multiple Spanning Tree Protocol (MSTP), Resilient Packet Ring (RPR), and Link Aggregation (LAG). However, these mechanisms are limited to link failures and are not designed to easily scale in large networks. Furthermore, they do not support sub-50 ms protection switching in either a ring or linear environment. In addition, since spanning tree protocols are not used in PBB-TE, this also excludes their use from the onset as a potential solution for offering PBB-TE trunk resiliency.

In SDH/SONET networks the Automatic Protection Switching (APS) function and protocol provides end-to-end circuit protection. This APS function and protocol can support 50 ms switchover, unidirectional and bi-directional switchover, revertive and non-revertive switchover, manual, and/or automatic switchover. The APS function may also support linear, ring, and mesh topologies. APS enables the switchover of circuits in case of circuit failure and is utilized in most synchronous networks.

ITU-T, through the G.8031/Y.1342 Recommendation, defines the use of the APS function and protocol for point-to-point VLAN-based subnetwork connection in Ethernet transport networks. The APS protocol is used to co-ordinate the two ends of a protection domain. APS messages are only sent on the protection path. Direct application of the G.8031 mechanisms on in a PBB-TE domain introduces additional complexity as the advent of the APS Protocol Data Unit (PDU) for signaling purposes contains substantial redundant information leading to a non-cost efficient solution.

For example, the G.8031 Recommendation states it is desirable for Continuity Check Messages (CCMs) to be sent with an interval of 3.3 ms and for the first three APS messages (resulting from a protection switch event at the originating end) to also be sent with a similar interval of 3.3 ms and then again with an interval of 5 seconds. This permits the loss of up to two APS messages due to errors or other phenomena while still achieving a 50 ms protection switch time.

SUMMARY

There is a need in the art of APS functionality in a PBB-TE domain for a simpler and more efficient bidirectional end-to-end linear protection switching mechanism. The present invention is intended for solutions addressing this need. A much simpler solution based on the exchange of CCMs and the use of the Remote Defect Indicator (RDI) for APS signaling is provided in the present invention.

The present invention provides a 1:1 bidirectional linear protection switching capability in a PBB-TE domain leveraging on the existing IEEE 802.1Qag Connectivity Fault Management (CFM), CCMs, and RDI field. The present invention also provides a simplified and efficient solution, which is well aligned to employ Ethernet technology.

Thus, in one embodiment, the present invention is directed to a method of providing Ethernet protection switching in a PBB-TE Domain. The method begins by establishing two PBB-TE trunks between a first B-component and a second B-component. Each trunk includes two unidirectional Ethernet Switching Paths (ESPs), each associated with a possibly different VLAN Identifier (VID). The method includes mapping data traffic onto the first PBB-TE trunk, where the first PBB-TE trunk corresponds to a working entity and the second PBB-TE trunk corresponding to a backup protection entity. Data traffic is sent on the first trunk via an ESP associated with one VID in one direction and another ESP associated with a possibly different VID in the opposite direction. The PBB-TE trunks are monitored for faults. Upon detecting a fault on one PBB-TE trunk, data traffic is remapped onto the other PBB-TE trunk via a third ESP associated with a third VID and a fourth ESP associated with a fourth VID.

In another embodiment, the present invention is directed to a system for providing Ethernet protection switching in a PBB-TE Domain. The system includes a first PBB-TE trunk between a first B-component and a second B-component, the first PBB-TE trunk having a first ESP for unidirectional traffic from the first B-component to the second B-component and a second ESP for unidirectional traffic from the second B-component to the first B-component. The first ESP is associated with a first VID and the second ESP is associated with a second VID. The system also includes a second PBB-TE trunk between the first B-component and the second B-component. The second PBB-TE has a third ESP for unidirectional traffic from the first B-component to the second B-component and a fourth ESP for unidirectional traffic from the second B-component to the first B-component. The third ESP is associated with a third VID and the fourth ESP is associated with a fourth VID. In addition, the system maps data traffic onto the first PBB-TE trunk where the first PBB-TE trunk corresponds to a working entity and the second PBB-TE trunk corresponds to a backup protection entity. The two PBB-TE trunks are monitored for faults. Upon detecting a fault on one PBB-TE trunk, data traffic is remapped onto the other PBB-TE trunk.

In still another embodiment, the present invention is directed to a node for providing Ethernet protection switching in a PBB-TE Domain. The node connects to a first PBB-TE trunk between the node and a second node. The first PBB-TE trunk has a first ESP for unidirectional traffic from the node to the second node and a second ESP for unidirectional traffic from the second node to the node. The first ESP is associated with a first VID and the second ESP is associated with a second VID. The node also connects to a second PBB-TE trunk between the node and the second node. The second PBB-TE trunk has a third ESP for unidirectional traffic from the node to the second node and a fourth ESP for unidirectional traffic from the second node to the node. The third ESP is associated with a third VID and the fourth ESP is associated with a fourth VID. The node maps data traffic onto the first PBB-TE trunk. The first PBB-TE trunk corresponds to a working entity and the second PBB-TE trunk corresponds to a backup protection entity. The two PBB-TE trunks are monitored for faults. Upon detecting a fault on one PBB-TE trunk, the node remaps data traffic onto the other PBB-TE trunk.

DETAILED DESCRIPTION

The present invention is a system and method for Ethernet protection switching in a PBB-TE domain. The present invention provides a 1:1 bidirectional linear protection switching capabilities in a PBB-TE domain. In a PBB-TE domain, Backbone Edge Bridges (BEBs) mark the demarcation between the Provider Backbone Bridged Network (PBBN) of interest and the networks attached to it. These BEBs are assumed to be B-BEBs or IB-BEBs each containing a B-Component. The protection domain is defined to be the area between the Customer Backbone Ports (CBPs) on the different B-Components of the involved BEBs. ESPs are provisioned from one BEB to the other, each one identified by the tuple <B-DA, B-SA, B-VID>. Each ESP represents a unidirectional path and the ESP pairs that form the bidirectional path define a PBB-TE trunk. The ESPs belonging to the same PBB-TE trunk are co-routed, but may also be identified by different B-VIDs.

Figure 1:
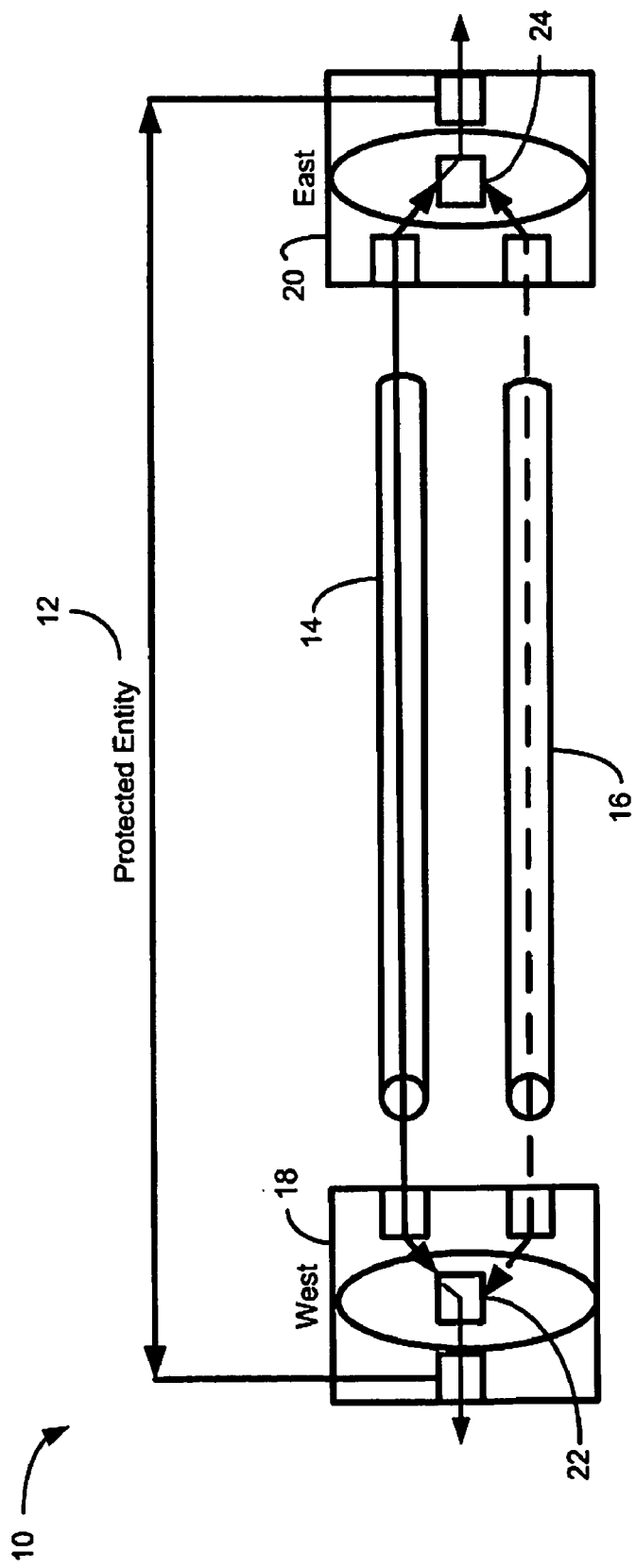
FIG. 1 (prior art) is a simplified block diagram illustrating essential elements of an end-to-end linear protection scheme and its arrangement in existing networks for a protection entity.
Figure 2:
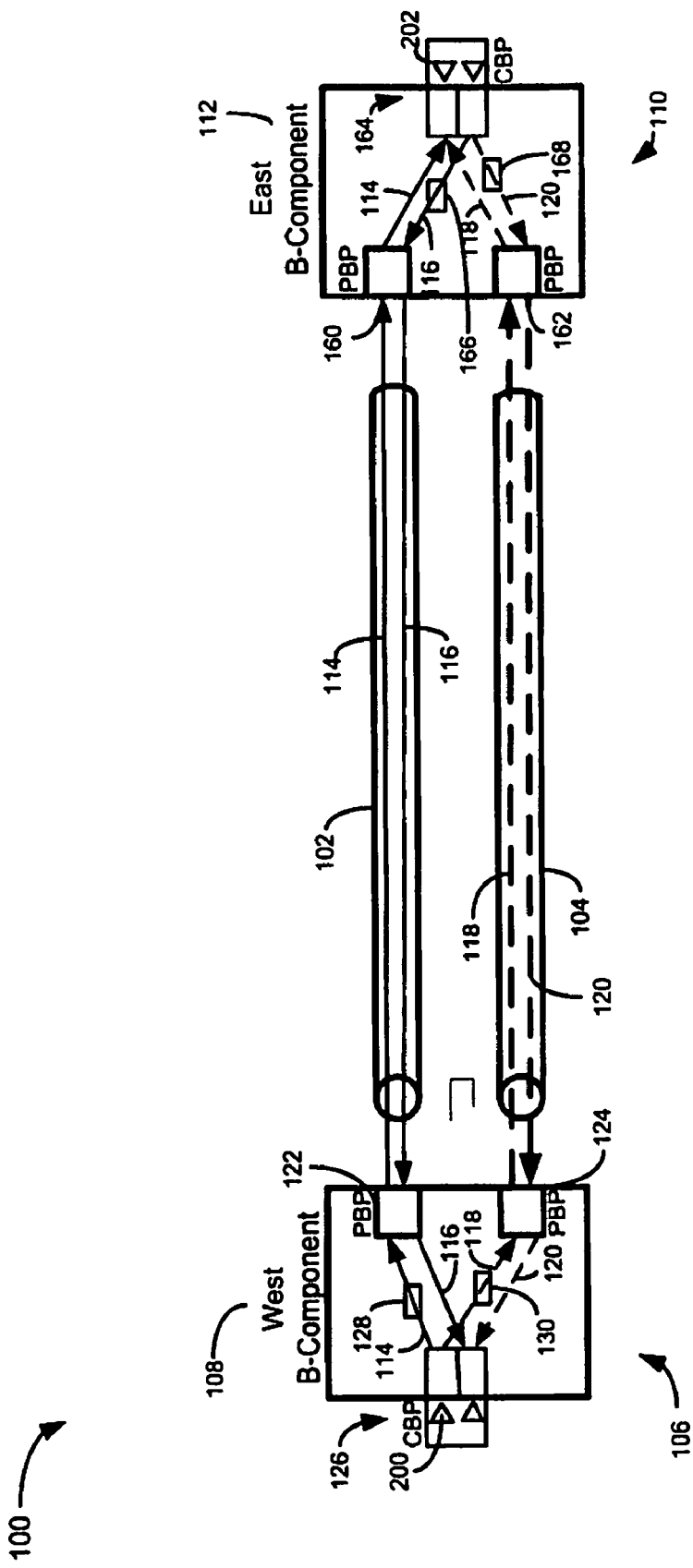
FIG. 2 is a simplified block diagram of a network illustrating PBB-TE trunk setup in the preferred embodiment of the present invention.

FIG. 2 is a simplified block diagram of a network 100 illustrating PBB-TE trunk setup in the preferred embodiment of the present invention. The network 100 includes at least two PBB-TE trunks, PBB-TE (Working Entity) trunk 102 and PBB-TE (Protection Entity) trunk 104, between a BEB 106 having West B-Component 108 and a BEB 110 having an East B-Component 112. The PBB-TE trunk 102 includes a West to East ESP 114 and an East to West ESP 116. Each ESP may correspond to the same or different B-VID settings for the two different directions. The PBB-TE trunk 104 includes a West to East ESP 118 and an East to West ESP 120.

The ESPs 114, 116, 118, and 120 are set by configuring entries in the filtering databases (FDBs) on all the bridges that these ESPs need to pass through and the VLAN membership of each participating port has to be set. There are two B-Components terminating the ESPs. As depicted in FIG. 2, the West B-Component 108 includes a Customer Backbone Port (CBP) 126 and a number of Provider Network Ports (PNPs), PNP 122, and PNP 124. The East B-Component 112 includes a CBP 164, and a number of PNPs, PNP 160 and PNP 162. The ESP 114 associated with VID 128 is part of the Working Entity 102 and is configured between CBP 126 and CBP 164. In addition, there is another ESP 118, associated with VID 130, which is part of the Protection Entity 104 and is configured between the CBP 126 and the CBP 164. Since ESP 114 is associated with VID 128, ports CBP 126 and PNP 122 on the West B-component 108 and ports PNP 160 and CPB 164 on the East B-Component 112 are configured to be members of the VID 128 member set. Since ESP 118 is associated with VID 130, ports CBP 126 and PNP 124 on the West B-component 108 and ports PNP 162 and CPB 164 on the East B-Component 112 are configured to be members of the VID 130 member set. In the opposite direction from the East B-component 112 to the West B-component 108, there is the ESP 116 associated with VID 166 which is part of the Working Entity 102 and is configured between CBP 164 and CBP 126 and a fourth ESP 120, associated with VID 168, which is part of the Protection Entity 104 and is configured between the CBP 164 and the CBP 126. Since the ESP 116 is associated with VID 166, ports CBP 126 and PNP 122 on the West B-component 108 and ports PNP 160 and CPB 164 on the East B-Component 112 are configured to be members of the VID 166 member set. Since ESP 120 is associated with VID 168, ports CBP 126 and PNP 124 on the West B-component 108 and ports PNP 162 and CPB 164 on the East B-Component 112 are configured to be members of the VID 168 member set. Frames are tagged for a specific VID and may only egress or ingress with associated ports.

Configuring the PBB-TE trunks means that the corresponding Maintenance Associations (MAs) are configured as well. One MA is set to monitor the top (trunk-1) PBB-TE trunk and a second to monitor the bottom (trunk-2) PBB-TE. Each of these two MAs may be associated with a pair of Virtual LAN Identifiers (VIDs), where each VID corresponds to one unidirectional ESP. The MA that monitors the PBB-TE trunk-1 may then contain both the VIDs in its VID list. The Maintenance End Points (MEPs), associated with this MA are Up MEPs, configured on the CBPs that demark the associated PBB-TE trunk. For example, where two VIDs are used for one PBB-TE trunk, each of the MEPs has its own primary VID (e.g., VID 128 for the MEP on the West B-component associated with the PBB-TE trunk 102, and VID 166 for the MEP on the East B-component). In this configuration, each MEP may receive frames that are tagged with any of the VIDs in the MA list, but send frames that are tagged only with that MEP's primary VID. In particular, in the depicted example, the MEP for the working entity on the West B-component may send only specified VID 128 tagged Continuity Check Messages (CCMs) while the corresponding MEP on the East component may only send VID 166 tagged frames. Both MEPs may receive CCM frames that are tagged for either VID 166 or 128.

Figure 3:
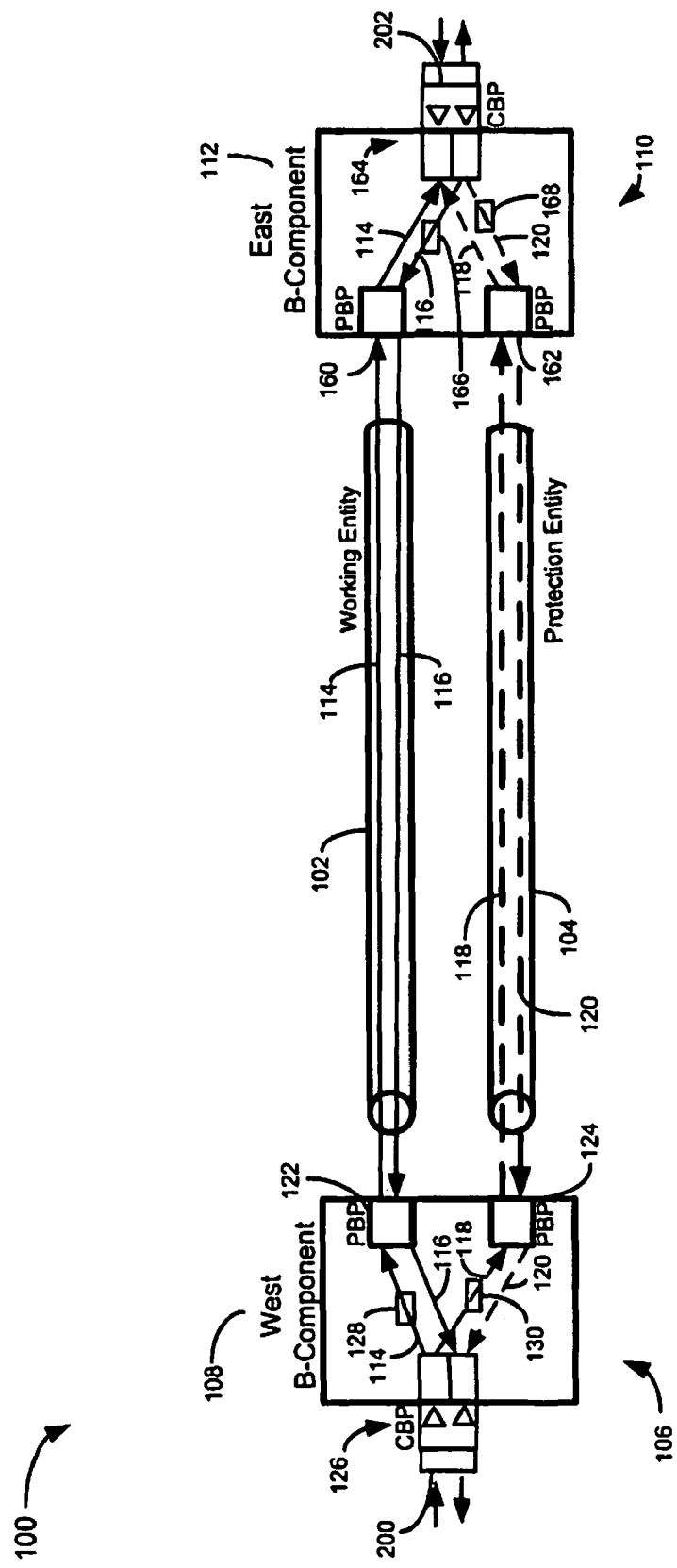
FIG. 3 is a simplified block diagram illustrating mapping of specific data traffic to a working entity in the network of FIG. 2.

Data traffic is mapped to a PBB-TE trunk by configuring the CBP parameters. In particular, the CBP backbone instance service identifier is used to allow only specific service instances to be carried by the PBB-TE trunk and the B-VID column on the Backbone Service Instance table or, if this is not supported, the CBP's Port VID (PVID) parameter may be used to map the identified service instances to a specific ESP. FIG. 3 is a simplified block diagram illustrating mapping of specific data traffic to a working entity in the network 100 of FIG. 2. The CBP's PVID value for the CBP 126 is associated with VID 128, while the CBP 164 is associated with the VID 166. As depicted, the network includes an MEP 200 associated with VID 128 on the West B-Component 108 and a MEP 202 associated with the VID 166 on the East B-Component 112.

As a result of this configuration, frames of specific Backbone Service Instance Identifier (I-SID) values that reach the CBP on the West B-component 108 are mapped to the ESP 114, while specific frames that reach the CBP on the East B-component 112 are mapped on the ESP 116. Thus, the PBB-TE trunk 102 corresponds to the working entity and PBB-TE trunk 104 corresponds to a stand-by protection entity. Without regard to how the data traffic is mapped to the PBB-TE trunks, CCM frames are exchanged on both the working and protected entities in order to regularly check the provided connectivity.

Figure 4:
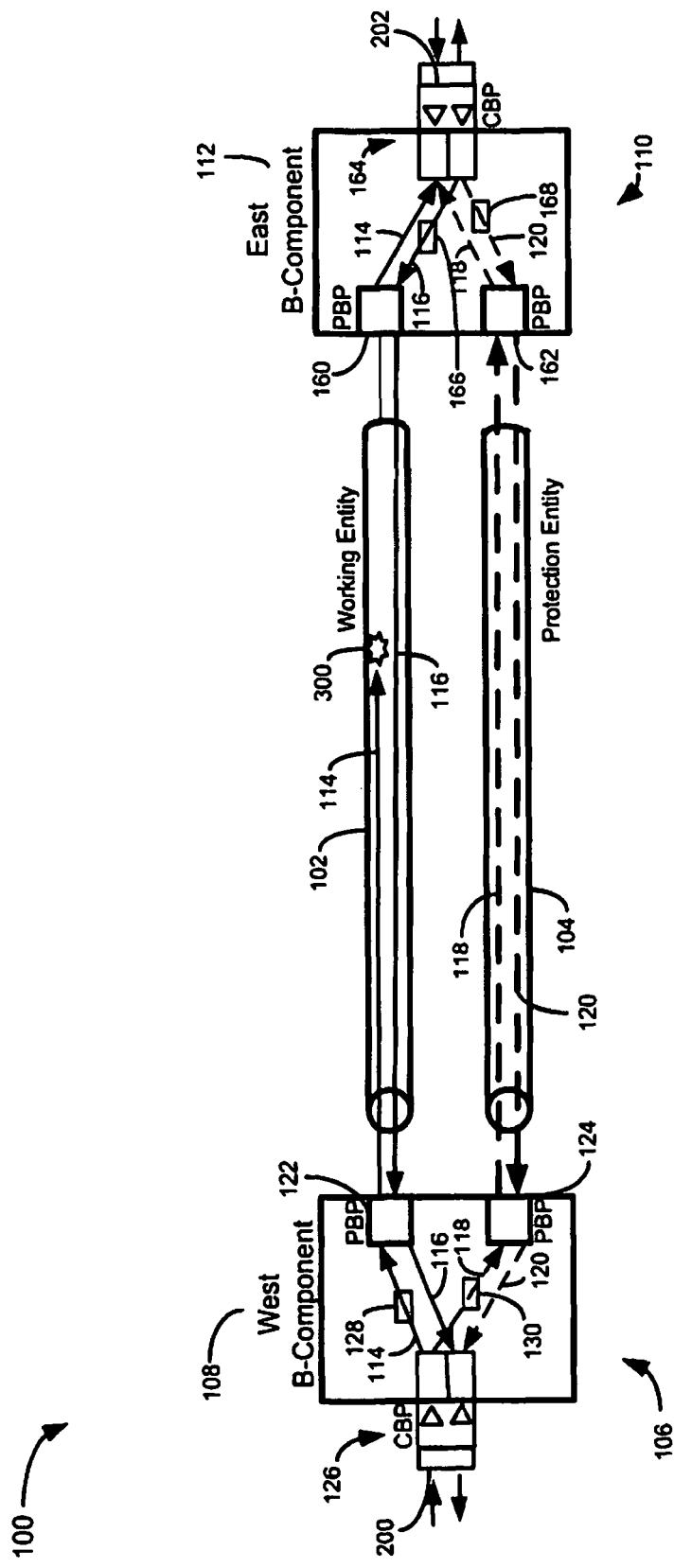
FIG. 4 is a simplified block diagram illustrating a fault in a working entity of the network of FIG. 2.

FIG. 4 is a simplified block diagram illustrating a fault in a working entity of the network 100 of FIG. 2. If a fault occurs at any of the ESPs, the MEP on the receiving end is notified. For example, if a fault 300 on the ESP 114 occurs, the MEP 202 on the East B-component 112 declares a remote MEP defect by setting an rMEPCCMdefect parameter. The timer counter for timing out CCMs has a granularity finer than or equal to ¼ of the time represented by the CCMinterval variable (the configured time between CCM transmissions). A Bridge does not set rMEPCCMdefect within (3.25*CCMinterval seconds of the receipt of a CCM, and sets rMEPCCMdefect within (3.5*CCMinterval) seconds after the receipt of the last CCM. The setting of the rMEPCCMdefect parameter results in a change of the PVID parameter of the CBP to VID 168, which is the BVID of the associated provisioned ESP on the protection PBB-TE trunk 104 (the PVID parameter also changes when the xConCCMdefect or the errorCCMdefect parameters are set as these indicate a very serious misconfiguration problem). All subsequent CCMs sent via the MEP associated with the VID 166 have their RDI field set (for as long as proper CCMs are not received by the MEP).

Figure 5:
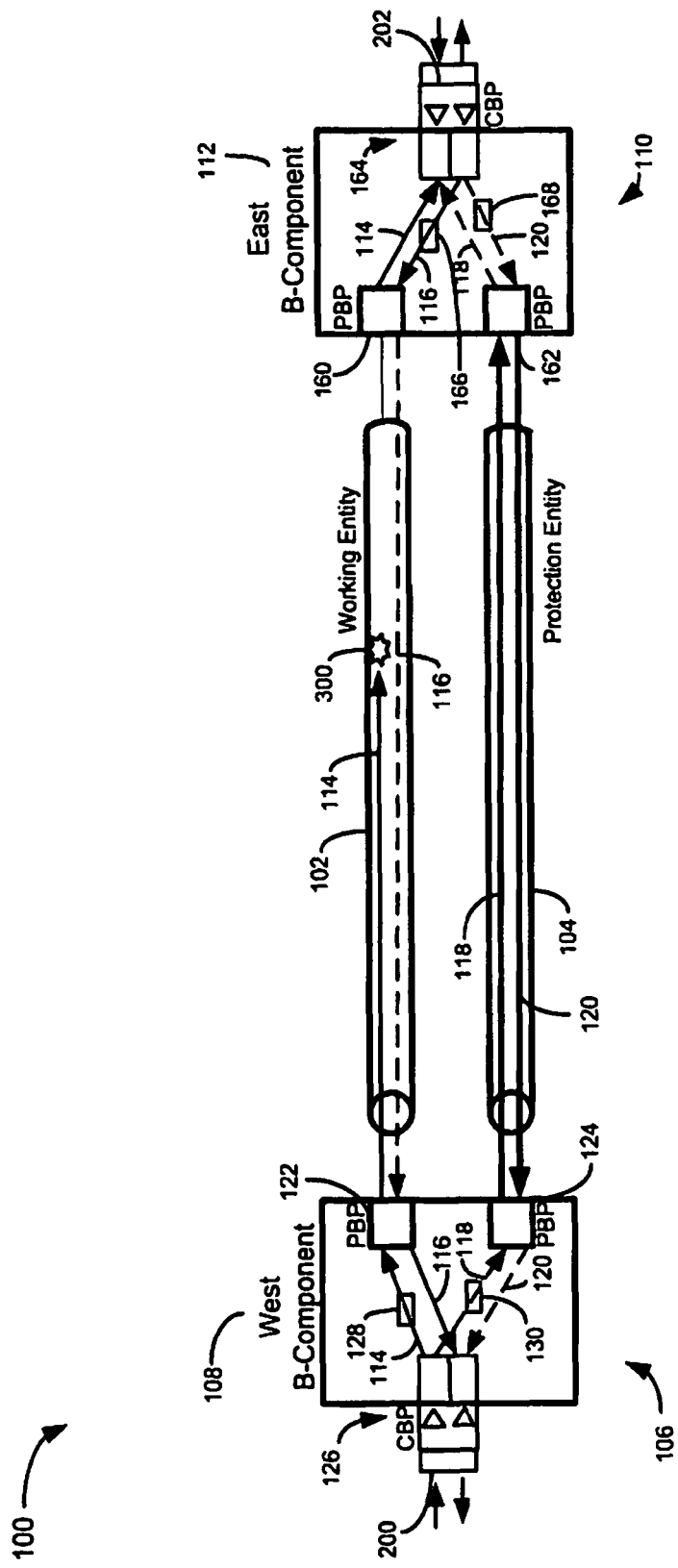
FIG. 5 is a simplified block diagram of the network illustrating remapping of specific data traffic to the protection entity.

FIG. 5 is a simplified block diagram of the network 100 illustrating remapping of specific data traffic to the protection entity. Reception of a CCM frame with the RDI field set (or an event that causes setting of the someRMEPCCMdefect, xConCCMdefect, or errorCCMdefect) causes the associated B-VID entry in the Backbone Service Instance table to change to the preconfigured value of the protection ESP (i.e., associating with the ESP 118 and corresponding VID 130). Alternatively, if the B-VID column is not supported, the PVID parameter of the CBP 126 on the West B-component 108 is changed to the preconfigured value of the protection ESP. This results in moving the specific service instance to the protection PBB-TE trunk 104 as depicted in FIG. 5.

Figure 6:
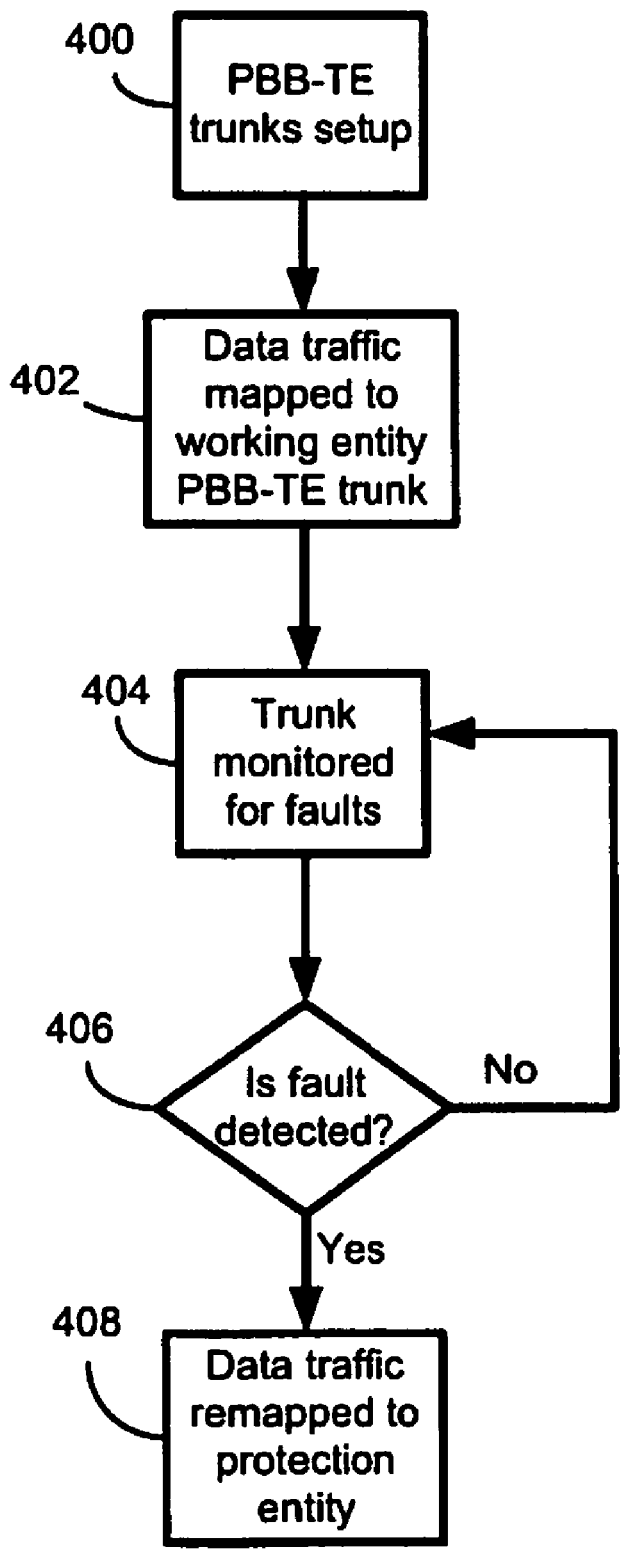
FIG. 6 is a flow chart illustrating the steps of setting up and mapping PBB-TE trunks to provide protection switching capabilities in a PBB-TE domain.

FIG. 6 is a flow chart illustrating the steps of setting up and mapping PBB-TE trunks to provide protection switching capabilities in a PBB-TE domain. With reference to FIGS. 2-6, the method will now be explained. In step 400, the PBB-TE trunks are set up. The PBB-TE trunk 102 is established as the working entity and includes the ESP 114 associated with the VID 128 in one direction (i.e., west to east) and the ESP 116 associated with the VID 166 in another direction (i.e., east to west). The PBB-TE trunk 104 is established as the protection entity and includes the ESP 118 associated with the VID 130 in one direction (i.e., west to east) and the ESP 120 associated with the VID 168 in another direction (i.e., east to west). Next, in step 402, data traffic is mapped to the specified PBB-TE trunk (i.e., PBB-TE trunk 102) by configuring the CBP parameters. In particular, the CBP backbone instance service identifier is used to allow only specific service instances to be carried by the PBB-TE trunk while the CBP's B-VID column in their Backbone Service Instance tables. Alternatively, if this is not supported, the Port VID (PVID) parameter may be used to map the identified service instances to a specific ESP. The CBP's PVID or B-VID value for the CBP 126 is associated with the VID 128 while the CBP 164 is associated with the VID 166. As a result of this configuration, frames of specific I-SID values that reach the CBP on the West B-component 108 are mapped to the ESP 114, while specific frames that reach the CBP on the East B-component 112 are mapped on the ESP 116. Thus, the PBB-TE trunk 102 corresponds to the working entity and PBB-TE trunk 104 corresponds to a stand-by protection entity. Without regard to how the data traffic is mapped to the PBB-TE trunks, CCM frames are exchanged on both the working and protected entities in order to regularly check the provided connectivity.

The method then moves to step 404 where the trunks are monitored for faults. Next, in step 406, it is determined if a fault is detected. If a fault is not detected, the method continues to monitor the trunks in step 404. However, in step 406, if it is determined that a fault on the working entity is detected, the method moves to step 408 where data traffic is remapped to the protection entity. If a fault occurs at any of the ESPs, the MEP on the receiving end is notified. For example, if a fault 300 on the ESP 114 occurs, the MEP 202 on the East B-component 112 declares a remote MEP defect by setting an rMEPCCMdefect parameter. The timer counter for timing out CCMs has a granularity finer than or equal to ¼ of the time represented by the CCMinterval variable (the configured time between CCM transmissions). A Bridge does not set rMEPCCMdefect within (3.25*CCMinterval seconds of the receipt of a CCM, and sets rMEPCCMdefect within (3.5*CCMinterval) seconds after the receipt of the last CCM. The setting of the rMEPCCMdefect parameter results in a change of the Backbone Service Instance table's B-VID column or the PVID parameter of the CBP to the VID 168, which is the BVID of the associated provisioned ESP on the protection PBB-TE trunk 104. All subsequent CCMs sent via the MEP associated with the VID 166 have a RDI field set (for as long as proper CCMs are not received by the MEP). A reception of a CCM frame with the RDI field set (or an event that causes setting of the someRMEPCCMdefect, xConCCMdefect or errorCCMdefect) causes a change of the Backbone Service Instance table's B-VID column value or the PVID parameter of the CBP 126 on the West B-component 108, to the preconfigured value of the protection ESP (i.e., associating with the ESP 118 and corresponding VID 130). This results in moving the specific service instance to the protection PBB-TE trunk 104.

The present invention provides a system and method offering a 1:1 bidirectional linear protection switching capability in a PBB-TE domain leveraging on the existing IEEE 802.1Qag Connectivity Fault Management (CFM), CCMs, and RDI field. The present invention also provides a simplified and efficient solution, which is well aligned with the intrinsic characteristics of Ethernet technology.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of providing Ethernet protection switching in a Provider Backbone Bridging Traffic Engineering (PBB-TE) Domain, the method comprising the steps of: establishing a first PBB-TE trunk between a first backbone component (B-component) and a second B-component, the first PBB-TE trunk having a first Ethernet switching path (ESP) for unidirectional traffic from the first B-component to the second B-component and a second ESP for unidirectional traffic from the second B-component to the first B-component, wherein the first ESP is associated with a first Virtual Local Area Network (VLAN) Identifier (VID), and the second ESP is associated with a second VID; establishing a second PBB-TE trunk between the first B-component and the second B-component, the second PBB-TE trunk having a third ESP for unidirectional traffic from the first B-component to the second B-component and a fourth ESP for unidirectional traffic from the second B component to the first B-component, wherein the third ESP is associated with a third V1D and the fourth ESP is associated with a fourth V1D; configuring a Backbone Service Instance table for a Customer Backbone Port (CBP) of the first B-component, wherein the Backbone Service Instance table includes an entry for each of one or more service instances supported by the first B-component, and wherein each of the supported service instances is associated with a Backbone Service Instance Identifier (I-SID); exchanging data traffic between the PBB-TE Domain and an attached network at the CBP, wherein the data traffic is identified by a first I-SID; filtering the data traffic entering the PBB-TE domain at the first B-Component based on I-SID values configured for the CBP; mapping data traffic entering the PBB-TE Domain at the first B-Component onto a PBB-TE trunk by setting a Backbone VID (B-VID) entry for the first I-SID in the Backbone Service Instance table to a working, entity VID identifying a working entity for that I-SID, the first PBB-TE trunk corresponding to the working entity and the second PBB-TE trunk corresponding to a backup protection entity for that I-SID; transmitting I-SID identified data traffic entering the PBB-TE Domain at the first B-Component on the first PBB-TE trunk in accordance with the mapping; configuring a respective PBB-TE Maintenance End Point (MEP) on the CBP to monitor each PBB-TE trunk; monitoring Continuity Check Messages (CCMs) received over the first PBB-TE trunk for faults on the first PBB-TE trunk, wherein a Remote Defect Indicator (RDI) included in each CCM indicates whether a fault has occurred on the first PBB-TE trunk; upon detecting a fault on the first PBB-TE trunk, remapping I-SID identified data traffic onto the second PBB-TE trunk by changing the B-VID entry for the first I SID from the working entity VID to a predetermined protection entity VID associated with the working entity VID; and transmitting received I-SID identified data traffic on the second PBB-TE trunk in accordance with the remapping.

2. The method according to claim 1, wherein the monitoring step also includes monitoring the second PBB-TE trunk for faults, wherein when a fault is detected on the second PBB-TE trunk, data traffic is remapped onto the first PBB-TE trunk.

3. The method according to claim 1, wherein:
the first B-component includes a first ingress port associated with the second VID and a first egress port associated with the first VID, the first ingress port receiving data traffic via the second ESP and the first egress port send data traffic via the first ESP to the second B-component; and
the second B-component includes a second ingress port associated with the first VID and a second egress port associated with the second VID, the second ingress port receiving data traffic via the first ESP and the second egress port sending data traffic via the second ESP to the first B-component.

4. The method according to claim 3, wherein the step of remapping data onto the second PBB-TE trunk includes reconfiguring the ports in the first and second B-components to send and receive traffic via the third and fourth ESPs.

5. The method according to claim 1, wherein a first Maintenance Association (MA) monitors the first PBB-TE trunk and a second MA monitors the second PBB-TE trunk for faults.

6. The method according to claim 5, wherein the first MA is associated with the first and second VIDs and the second MA is associated with the third and fourth VIDs.

7. The method according to claim 6, wherein:
the first B-component includes a first Maintenance End Point (MEP) for monitoring the first ESP, the first MEP being associated with the first VID;
the second B-component includes a second MEP for monitoring the second ESP, the second MEP being associated with the second VID;
the first MEP sending Continuity Check Messages (CCMs) to the second B-component via the first ESP and the second MEP sending CCMs via the second ESP.

8. The method according to claim 7, wherein, upon detecting a fault, the first or second MEP detects the fault and sets a defect setting parameter, thereby triggering the step of remapping data traffic onto the second PBB-TE trunk.

9. The method according to claim 6, wherein:
the first B-component includes a third Maintenance End Point (MEP) for monitoring the third ESP, the third MEP being associated with the third VID;
the second B-component includes a fourth MEP for monitoring the fourth ESP, the fourth MEP being associated with the fourth VID;
the third MEP sending Continuity Check Messages (CCMs) to the third B-component via the third ESP and the fourth MEP sending CCMs via the fourth ESP.

10. The method according to claim 1, further includes the step of sending Continuity Check Messages (CCMs) via the first and second PBB-TE trunks to check connectivity of the trunks.

11. The method according to claim 1, wherein the first VID differs from the second VID, and the third VID differs from the fourth VID.

12. The method according to claim 1, wherein the first VID and the second VID are the same or the third VID and the fourth VID are the same.

13. A system for providing Ethernet protection switching in a Provider Backbone Bridging Traffic Engineering (PBB-TE) Domain, the system comprising: a first PBB-TE trunk between a first backbone component (B-component) and a second B-component, the first PBB-TE trunk having a first Ethernet switching path (ESP) for unidirectional traffic from the first B-component to the second B-component and a second ESP for unidirectional traffic from the second B-component to the first B-component, wherein the first ESP is associated with a first Virtual Local Area Network (VLAN) Identifier (VID), and the second ESP is associated with a second VID; a second PBB-TE trunk between the first B-component and the second B-component, the second PBB-TE trunk having a third ESP for unidirectional traffic from the first B-component to the second B-component and a fourth ESP for unidirectional traffic from the second B-component to the first B-component, wherein the third ESP is associated with a third VID and the fourth ESP is associated with a fourth V1D; and the first B-component, wherein the first B-component comprises a Customer Backbone Port (CBP) and the first B-component is configured to: maintain a Backbone Service Instance table for the CBP, wherein the Backbone Service Instance table includes an entry for each of one or more service instances supported by the first B-component, and wherein each of the supported service instances is associated with a Backbone Service Instance Identifier (I-SID); exchange data traffic between the PBB-TE Domain and an attached network at the CBP, wherein the data traffic is identified by a first I-SID; filter the data traffic entering the PBB-TE domain at the first B-Component based on I-SID values configured for the CBP; map data traffic entering the PBB-TE Domain at the first B-Component onto a PBB-TE trunk by setting a Backbone VID (B-VID) entry for the first I-SID in the Backbone Service Instance table to a working entity VID identifying a working entity for that I-SID, the first PBB-TE trunk corresponding to the working entity and the second PBB-TE trunk corresponding to a backup protection entity for that I-SID; transmit I-SID identified data traffic entering the PBB-TE Domain at the first B-Component on the first PBB-TE trunk in accordance with the mapping; establish a respective PBB-TE Maintenance End Point (MEP) on the CBP to monitor each PBB-TE trunk; monitor Continuity Check Messages (CCMs) received over the first PBB-TE trunk for faults on the first PBB-TE trunk, wherein a Remote Defect Indicator (RDI) included in each CCM indicates whether a fault has occurred on the first PBB-TE trunk; remap I-SID identified data traffic onto the second PBB-TE trunk in response to detecting a fault on the first PBB-TE trunk by changing the B-VID entry for the first I-SID from the working entity VID to a predetermined protection entity VID associated with the working entity VID; and transmit received I-SID identified data traffic on the second PBB-TE trunk in accordance with the remapping.

14. The system according to claim 13, wherein the first B-component is further configured to monitor the second PBB-TE trunk for faults and when a fault is detected on the second PBB-TE trunk, to remap data traffic onto the first PBB-TE trunk.

15. The system according to claim 13, wherein: the first B-component includes a first ingress port associated with the second VID and a first egress port associated with the first VID, the first ingress port configured to receive data traffic via the second ESP and the first egress port configured to send data traffic via the first ESP to the second B-component; and the second B-component includes a second ingress port associated with the first VID and a second egress port associated with the second VID, the second ingress port configured to receive data traffic via the first ESP and the second egress port configured to send data traffic via the second ESP to the first B-component.

16. The system according to claim 15, wherein the first B-component is configured to remap the data traffic onto the second PBB-TE trunk by reconfiguring the ports in the first and second B-components to send and receive traffic via the third and fourth ESPs.

17. The system according to claim 13, further comprising a first Maintenance Association (MA) configured to monitor the first PBB-TE trunk and a second MA configured to monitor the second PBB-TE trunk.

18. The system according to claim 17, wherein the first MA is associated with the first and second VIDs and the second MA is associated with the third and fourth VIDs.

19. The system according to claim 18, wherein: the MEPs that the first B-component is configured to establish include a first MEP; the first MEP is configured to monitor the first ESP and the first MEP is associated with the first VID; the second B-component is configured to establish a second MEP to monitor the second ESP, the second MEP being associated with the second VID; and the first MEP is configured to send Continuity Check Messages (CCMs) to the second B-component via the first ESP and the second MEP is configured to send CCMs via the second ESP.

20. The system according to claim 19, wherein, the MEPs that the first B-component is configured to establish further include a third MEP; the third MEP is configured to monitor the third ESP and the third MEP is associated with the third VID; the second B-component is configured to establish a fourth MEP to monitor the fourth ESP, the fourth MEP being associated with the fourth VID; and the third MEP is configured to send CCMs to the third B-component via the third ESP and the fourth MEP is configured to send CCMs via the fourth ESP.

21. The system according to claim 19, wherein the first B-component is configured to, upon detecting a fault, set a defect setting parameter, thereby triggering the remapping data traffic onto the second PBB-TE trunk.

22. The system according to claim 13, wherein the first B-component is further configured to send Continuity Check Messages (CCMs) via the first and second PBB-TE trunks to check connectivity of the trunks.

23. The system according to claim 13 wherein the first VID differs from the second VID, and the third VID differs from the fourth VID.

24. The system according to claim 13, wherein the first VID and the second VID are the same or the third VID and the fourth VID are the same.

25. A node for providing Ethernet protection switching in a Provider Backbone Bridging Traffic Engineering (PBB-TE) Domain, the node comprising: a first Provider Network Port (PNP) operable to connect to a first PBB-TE trunk between the node and a remote node, the first PBB-TE trunk having a first Ethernet switching path (ESP) for unidirectional traffic from the remote node to the node, wherein the first ESP is associated with a first Virtual Local Area Network (VLAN) Identifier (VID), and the second ESP is associated with a second VID; a second PNP operable to connect to a second PBB-TE trunk between the node and the remote node, the second PBB-TE trunk having a third ESP for unidirectional traffic from the node to the remote node and a fourth ESP for unidirectional traffic from the remote node to the node, wherein the third ESP is associated with a third V1D and the fourth ESP is associated with a fourth V1D; and a Customer Backbone Port (CBP) operable to attached to a network and to receive data traffic from the attached network, and wherein the node is configured to: maintain a Backbone Service Instance table for the CBP, wherein the Backbone Service Instance table includes an entry for each of one or more service instances supported by the node, and wherein each of the supported service instances is associated with a Backbone Service Instance Identifier (I-SID); exchange data traffic between the PBB-TE Domain and attached network at the CBP, wherein the data traffic is identified by a first I-SID; filter the data traffic entering the PBB-TE domain at the node based on I-SID values configured for the CBP; map data traffic entering the PBB-TE Domain at the node onto a PBB-TE trunk by setting a Backbone VID (B-VID) entry for the first I-SID in the Backbone Service Instance table to a working entity VID identifying a working entity for that I-SID, the first PBB-TE trunk corresponding to the working entity and the second PBB-TE trunk corresponding to a backup protection entity for that I-SID; transmit I-SID identified data traffic entering the PBB-TE Domain at the node on the first PBB-TE trunk in accordance with the mapping; establish a respective PBB-TE Maintenance End Point (MEP) on the CBP to monitor each PBB-TE trunk; monitor Continuity Check Messages (CCMs) received over the first PBB-TE trunk for faults on the first PBB-TE trunk, wherein a Remote Defect Indicator (RDI) included in each CCM indicates whether a fault has occurred on the first PBB-TE trunk; upon detecting a fault on the first PBB-TE trunk, remap I-SID identified data traffic onto the second PBB-TE trunk by changing the B-VID entry for the first I SID from the working entity VID to a predetermined protection entity VID associated with the working entity VID; and transmit received I-SID identified data traffic on the second PBB-TE trunk in accordance with the remapping.

26. The node according to claim 25, wherein the node is further configured to monitor the second PBB-TE trunk for faults and, when a fault is detected on the second PBB-TE trunk, to remap data traffic onto the first PBB-TE trunk.

27. The node according to claim 25, wherein the node is configured to remap the data traffic onto the second PBB-TE trunk by reconfiguring the ports in the node to send and receive traffic via the third and fourth ESPs.

28. The node according to claim 25, further comprising a first Maintenance Association (MA) configured to monitor the first PBB-TE trunk and a second MA configured to monitor the second PBB-TE trunk.

29. The node according to claim 28, wherein the first MA is associated with the first and second VIDs and the second MA is associated with the third and fourth VIDs.

30. The node according to claim 25, wherein the node is further configured to send Continuity Check Messages (CCMs) via the first and second PBB-TE trunks to check connectivity of the trunks.

31. The node according to claim 25, wherein the node is a B-Component of a Backbone Edge Bridge.

32. The node according to claim 25, wherein the first VID differs from the second VID, and the third VID differs from the fourth VID.

33. The node according to claim 25, wherein the first VID and the second VID are the same or the third VID and the fourth VID are the same.

* * * * *